United States Patent [19]
Suzuki et al.

[11] 4,161,557
[45] Jul. 17, 1979

[54] POLYVINYL BUTYRAL-LIQUID CRYSTAL FILM-FORMING COMPOSITION AND FILM

[75] Inventors: Fred K. Suzuki, Arlington Heights; Thomas W. Davison, Streamwood, both of Ill.

[73] Assignee: Liquid Crystal Products, Inc., Arlington Heights, Ill.

[21] Appl. No.: 889,285

[22] Filed: Mar. 23, 1978

[51] Int. Cl.$^2$ ................................................ B44F 1/00
[52] U.S. Cl. ........................................ 428/1; 252/299; 350/350; 428/40; 428/437; 428/500; 428/522; 428/913
[58] Field of Search ...................... 428/40, 500, 1, 913, 428/522, 437; 350/160 LC; 252/299

[56] References Cited
U.S. PATENT DOCUMENTS
3,620,889  11/1971  Baltzer ...................................... 428/1

OTHER PUBLICATIONS
"Butvar", Monsanto Polymers & Petrochemicals Co., Technical Bulletin No. 6070B, pp. 1-48.
"Paraplex Synthetic Resins for Coatings", Rohm and Haas Co., pp. 1-12, Nov. 1969.
"Paraplex Synthic Resins", Rohm and Haas Co., pp. 1-16, Apr., 1976.

*Primary Examiner*—Marion E. McCamish
*Attorney, Agent, or Firm*—Gerlach & O'Brien

[57] ABSTRACT

An alkyd-type polymeric plasticizing resin or castor oil is incorporated in a mixture of a polyvinyl butyral film-forming polymer and a cholesteric liquid crystalline phase material, to provide a composition which when in the form of a film exhibits accentuated intensity and contrast of visible light waves reflected by the material.

25 Claims, 7 Drawing Figures

POLYVINYL BUTYRAL-LIQUID CRYSTAL FILM-FORMING COMPOSITION AND FILM

BACKGROUND OF THE INVENTION

This invention relates to a polyvinyl butyral-liquid crystal film-forming composition and to a film formed thereof. More particularly, the invention relates to a new and improved composition which when in the form of a film exhibits accentuated intensity and contrast of visible light waves reflected by the liquid crystals.

Cholesteric liquid crystalline phase materials, also referred to as cholesteric liquid crystals, their technology and their applications are reviewed in the book by Peter L. Carroll entitled "Cholesteric Liquid Crystals," June, 1973 (Ovum ltd., London). The materials, herein referred to for convenience at times simply as "liquid crystals," are a class of compounds that display a cholesteric mesophase or are in a cholesteric mesomorphic state within certain temperature limits. The cholesteric mesophase or mesomorphic state is a state of matter intermediate in molecular ordering between a crystalline solid and an isotropic liquid. In general, the liquid crystals are colorless in their solid and isotropic liquid states, assuming the coloration of their background or of light-absorptive materials added thereto. When the liquid crystals are in the cholesteric mesophase, and non-polarized white light is directed at them, the light is separated essentially into two components, one of which is transmitted and one of which is reflected or "scattered." The reflected light gives the material an iridescent color. The dominant wave length of the reflected light depends upon the liquid crystals and the angle of the incident light beam, and also is affected by stimuli applied to the liquid crystals, such as heat, physical stress, electricity, magnetism, and radiation, which are types of applied energy, the presence of other materials, which may be present as contaminants, and materials present in the environment and which act upon the liquid crystals.

An important property of the individual cholesteric liquid crystalline phase materials and of mixtures of different materials is that, all other conditions being equal, they always display the same color at a specific temperature. The characteristic color is changed by the application of one of the above-described stimuli, furnishing a direct, visible response which may be utilized in a detector system. A stimulus either can interact directly with the liquid crystals, or can be converted into a stimulus which does interact. The color responses to stimuli are utilized in systems for measuring and/or detecting specific temperatures and temperature changes, detecting radiation, measuring stress, monitoring the presence of gases and vapors, and other purposes. The iridescent colors create an aesthetic appeal which may be utilized in interior design, displays, novelty items, toys, and other applications.

The temperature sensitivity of the liquid crystals finds important use in thermometers and thermographic systems. In general, when viewed against a black absorptive background color, the liquid crystals change in color from red to green to blue to violet with increasing temperature in the mesophase temperature range, and the reverse color change takes place with decreasing temperature therein. Above and below the mesophase temperature range, the liquid crystals assume the color of the background.

Certain cholesteric liquid crystalline phase materials and their mixtures with other materials produce a metastable, ordered glass when fast-cooled from a first temperature in the mesophase temperature range thereof, to a second temperature below the glass-transition temperature (Tg) thereof, while retaining a color which is characteristic of the liquid crystal when at the first temperature, and when warmed from the second temperature to a temperature substantially equal to the glass-transition temperature, or to a temperature exceeding the latter, exhibit a color change which is irreversible by cooling from the glass-transition temperature, or the higher temperature (not reaching the first temperature), to the second temperature, thereby to visually indicate the occurrence of such warming. This irreversible color-temperature play, disclosed, for example, in U.S. Pat. No. 3,594,126, can be used to indicate that a temperature limit has been exceeded, such as in a frozen food thaw indicator.

Liquid crystals must be protected or shielded from the atmosphere unless they are used only for a relatively short period of time. Exposure to the atmosphere results in oxidation, causing the liquid crystals to deteriorate. Foreign particles from the atmosphere provide sites for crystallization and alter the delicately balanced mesomorphic state of the liquid crystals. Ultraviolet radiation may cause deterioration of the liquid crystals.

For protection against such exposure, protection against physical contacts, cleanliness, convenience in handling, and other reasons, liquid crystals in the past have been enclosed in various ways. In particular, liquid crystal-containing coatings, layers, films, sheets and the like have been provided, wherein the liquid crystals are protected by encapsulation or by dispersion in plastic materials. The liquid crystals have been encapsulated in gelatin-gum arabic, polyvinyl alcohol, zein, or other substances, such as disclosed in U.S. Pat. No. 3,585,381. Discrete naked aggregates of the liquid crystals have been dispersed in a substantially continuous solid polymeric matrix by drying an emulsion of the liquid crystals in an aqueous solution of a polymer such as polyvinyl alcohol or a polyacrylate, as disclosed in British Pat. No. 1,161,039, published Aug. 13, 1969, and U.S. Pat. No. 3,600,060, and by forming an organic solvent solution of a polymer and the liquid crystals, and removing the solvent to form a film or layer, suitable polymers including polyvinyl butyral, acrylic resin, styrene resins, polyester resins, epoxy resins, polyvinyl chloride, polyvinyl acetate, and polycarbonate, as disclosed in U.S. Pat. No. 3,620,889, and polyurethane, as disclosed in U.S. Pat. No. 3,872,050.

A two-component polymer system is required for making an acceptable liquid crystal-containing polyurethane film, and it is difficult to manufacture. Other films and sheets containing liquid crystals protected in the foregoing ways suffer from relatively low intensity of reflected or scattered colors and from poor color contrast. This has been the case with a liquid crystal-containing polyvinyl butyral film, in particular, which otherwise is a potentially useful film, owing to its ease of manufacture, and to the chemical resistance, water resistance and physical properties of the polymer.

SUMMARY OF THE INVENTION

The invention provides an improvement in a composition of matter including a mixture of a polyvinyl butyral film-forming polymer and a cholesteric liquid crystalline phase material, which mixture is adapted for forming a film comprising a matrix of the polymer having the material dispersed therein, such film providing a visible response to the application of energy, the improvement comprising a member selected from the group consisting of oil-modified alkyd-type polymeric plasticizing resins and castor oil intimately mixed with the polymer and the material, thereby to provide a composition which when in the form of such film exhibits accentuated intensity and contrast of visible light waves reflected or scattered by the material.

The alkyd-type polymeric plasticizing resin or castor oil functions as a color intensifier, serving to increase the proportion of incident light that is reflected or scattered, thereby increasing the intensity of reflected light, and the reflected light has a narrower wave band, resulting in improved color contrast. Increases in reflectance as much as four-fold are obtainable, while the width of the reflected wave band decreases correspondingly. The alkyd-type polymeric plasticizing resins and castor oil also are known plasticizers for polyvinyl butyral, and they function as such to provide supple films.

While we do not wish to be bound by any theory, it is noted that the alkyd-type polymeric plasticizing resins and castor oil, referred to hereinafter at times as "color intensifiers," at most are slightly soluble in or miscible with the liquid crystals, and they are emulsion-forming with the liquid crystals. Also, they are very soluble or dispersible in polyvinyl butyral-liquid crystal solutions in organic solvents. It is postulated that the color intensifiers decrease the surface energy at the interfaces between the polyvinyl butyral matrix and the liquid crystal aggregates, thereby reducing the particle size of the aggregates and providing a more uniform dispersion of the aggregates in the matrix. It is further postulated that the foregoing conditions lead to greater uniformity in the plane texture of the liquid crystals, i.e., the mesophase form in which light is selectively reflected to show brilliant colors, resulting in increased reflectance or scattering and increased selectivity of the reflected or scattered light.

DESCRIPTION OF THE PREFERRED EMBODIMENTS

Cholesteric liquid crystalline phase materials or liquid crystals which may be employed in the invention are well-known and readily may be selected for intended uses following the teachings of the prior art, including the patents and publication cited above. Thus, for example, liquid crystals which may be employed are described in detail in U.S. Pat. Nos. 3,114,836, 3,441,513, 3,533,399, and 3,594,126. Most commonly, two, three or four-component liquid crystal compositions are employed, for providing a desired color response, a mesophase or color-play temperature range at a desired temperature level and having a suitable width of temperature range, and/or a desired glass-transition temperature. Preferably, the liquid crystals are selected to provide a color response in the mesophase range changing with increasing temperature from red through orange, yellow, green, and blue to violet in the visible spectrum, as a result of light reflectance or scattering by the liquid crystals. In general, enantiotropic liquid crystals are preferred, although the invention is not limited thereto. Reference to an "enantiotropic" material means a liquid crystal which forms, or a mixture of liquid crystals which together form the cholesteric mesophase either by heating the material in its crystalline solid phase or by cooling the material in its isotropic liquid phase.

Preferred liquid crystals include the cholesteryl, dicholesteryl, cholestanyl, and sitosteryl organic esters, halides and alkyl carbonates. Table 1 is a list of liquid crystals which are further preferred in the invention.

TABLE 1

| | |
|---|---|
| Cholesteryl allyl carbonate | (CAC) |
| Cholesteryl erucyl carbonate | (CEC) |
| Cholesteryl methyl carbonate | (CMC) |
| Cholesteryl oleyl carbonate | (COC) |
| Cholesteryl phenyl carbonate | (CPC) |
| Cholesteryl p-nonylphenyl carbonate | (CNPC) |
| Cholesteryl acetate | (CA) |
| Cholesteryl benzoate | (CBz) |
| Cholesteryl butyrate | (CB) |
| Cholesteryl isobutyrate | (CiB) |
| Cholesteryl chloride | (CCl) |
| Cholesteryl chloracetate | (CCA) |
| Cholesteryl cinnamate | (CCn) |
| Cholesteryl crotanoate | (CCr) |
| Cholesteryl decanoate | (CDc) |
| Cholesteryl erucate | (CE) |
| Cholesteryl heptanoate | (CHp) |
| Cholesteryl hexanoate | (CHx) |
| Cholesteryl laurate | (CLa) |
| Cholesteryl myristate | (CMy) |
| Cholesteryl nonanoate | (CN) |
| Cholesteryl octanoate | (COt) |
| Cholesteryl oleate | (CO) |
| Cholesteryl propionate | (CP) |
| Cholesteryl valerate | (CV) |
| Cholesteryl benzoate | (CaBz) |
| Sitosteryl nonanoate | (SN) |
| Dicholesteryl carbonate | (DCC) |
| Dicholesteryl sebacate | (DCS) |
| Dicholesteryl adipate | (DCA) |
| Dicholesteryl malonate | (DCM) |
| Dicholesteryl glutarate | (DCG) |
| Dicholesteryl pimelate | (DCP) |
| Dicholesteryl succinate | (DCSu) |
| Dicholesteryl oxalate | (DCO) |
| Dicholesteryl maleate | (DCM1) |
| Dicholesteryl fumarate | (DCF) |
| Dicholesteryl citraconate | (DCCi) |
| Dicholesteryl mesaconate | (DCMs) |

Liquid crystal compositions which are preferred for certain uses are listed in Table 2 together with their mesophase temperature ranges.

TABLE 2

| Comp. No. | Components of Composition, % by Weight | | | | Mesophase Temp. Range, °C. |
|---|---|---|---|---|---|
| 1. | 50% CN | 33% COC | 8% CBz | 9% DCC | 28–33 |
| 2. | 56% CN | 44% COC | | | 31–32 |
| 3. | 48% CN | 44% COC | 8% DCC | | 31–33 |

TABLE 2-continued

| Comp. No. | Components of Composition, % by Weight | | | | Mesophase Temp. Range, °C. |
| --- | --- | --- | --- | --- | --- |
| 4. | 47% CN | 43% COC | 7% DCC | 3% CCl | 30–33 |
| 5. | 23% CN | 60% CO | 17% CCr | | 29–31 |
| 6. | 57% CN | 38% COC | 5% CMC | | 29–32 |
| 7. | 56% CN | 35% COC | 9% CBz | | 32–35 |
| 8. | 60% CN | 25% COC | 15% CBz | | 30–37 |
| 9. | 78% CN | 5% COC | 17% CP | | 34–37 |
| 10. | 62% CN | 29% COC | 9% CBz | | 36–39 |
| 11. | 80% CN | 20% CiB | | | 61–67 |
| 12. | 61% CN | 28% CiB | 11% CB | | 43–63 |
| 13. | 68% CN | 16% CiB | 16% CB | | 30–50 |
| 14. | 80% COC | 20% CHx | | | 8–12 |
| 15. | 71% COC | 24% CHx | 5% CB | | 0–8 |
| 16. | 67% COC | 23% CHx | 10% CC | | −20—−3 |

Compositions numbered 1 through 10 are useful for application to the human body, for purposes including vein location, evaluation of vascular and inflammatory conditions, and thermography. Compositions numbered 11 through 13 are useful for industrial, non-destructive testing and for laboratory work. Compositions numbered 14 through 16 are useful, inter alia, for leak detection in refrigeration.

In another preferred embodiment, the invention is employed to advantage with the liquid crystal compositions which when fast-cooled from their mesophase temperature range to a temperature below their glass-transition temperature produce an ordered glass while retaining the optical properties of the mesophase, as described above. As disclosed in U.S. Pat. No. 3,594,126, the individual liquid crystals which function to produce this result are viscous materials at the lower temperatures, and they act to retard the rate of color change. They act as viscosity-increasing agents when employed in effective amounts up to about 40% by weight of a mixture of liquid crystalline materials. Such agents include the dicholesteryl esters of saturated and unsaturated alpha, omega-dicarboxylic acids containing 2–27 carbon atoms and chloesteryl p-nonylphenyl carbonate, as disclosed in the foregoing patent, and other liquid crystals satisfying the above-described conditions, including cholesteryl cinnamate and cholesteryl allyl carbonate. As noted in the patent, the rate of cooling from the mesophase preferably is about 10° C. per minute or higher and rapidly enough to retain a color characteristic of the material at a temperature in the mesophase temperature range.

Representative liquid crystal compositions which may be employed for temperature limit detection at various temperatures over a relatively low temperature range, whereby they are useful in thaw indicators, are set forth in Table 3, together with their mesophase temperature ranges and their glass-transition temperatures (Tg).

Polyvinyl butyral (hereinafter abbreviated as "PVB" at times) of various commercial grades may be employed. Thus, for example, compositions and films in accordance with the invention are formed from polyvinyl butyral polymers having average molecular weights in the range of about 30,000–270,000, butyral contents expressed as polyvinyl butyral of about 80–90%, hydroxyl contents expressed as polyvinyl alcohol of about 9–21%, and acetate contents expressed as polyvinyl acetate of about 0–3%. Preferred polyvinyl butyral film-forming polymers, identified by the trademark "Butvar" (Monsanto Polymers & Petrochemicals Co.) are listed in Table 4, together with certain of their properties.

TABLE 4

| Butvar PVB Grade | Average Mol. Wt. × 1000 | PVB, % by Wt. Approx. | [1]PVAlcohol % by Wt. | [1]PVAcetate % by Wt. | Viscosity, cps |
| --- | --- | --- | --- | --- | --- |
| B 72 | 180–270 | 80 | 17.5–21.0 | 0–2.5 | 8,000–18,000 |
| B 73 | 50–80 | 80 | 17.5–21.0 | 0–2.5 | 1,000–4,000 |
| B 79 | 34–38 | 88 | 9.0–13.0 | 0–2.5 | 100–200 |
| B 90 | 38–45 | 80 | 18.0–20.0 | 0–1.0 | 600–1,200 |
| B 98 | 30–34 | 80 | 18.0–20.0 | 0–2.5 | 200–450 |

[1]ASTM Method D1396-58
[2]Brookfield viscometer, 15% by weight solution in 60:40 toluene:ethanol at 25° C.

The castor oil employed as a color intensifier in the invention preferably constitutes one of the lower viscosity fractions of raw castor oil, for ease of processing, but higher viscosity materials may be employed. Thus, it is preferred to employ process castor oil fractions of about 10–50 weight, more preferably, 30–40 weight.

The alkyd-type polymeric plasticizing resins employed as color intensifiers are non-drying straight oil-modified alkyd resins. The preferred resins are oil-modified polyesters of polybasic acids and polyhydric alcohols. The modifying oil preferably includes castor oil, i.e., raw castor oil or a fraction thereof. Preferred

TABLE 3

| Comp. No. | Components of Composition, % by Weight | | | | Mesophase Temp. Range, °C. | Tg, °C. |
| --- | --- | --- | --- | --- | --- | --- |
| 17 | 45% CN | 45% COC | 10% DCS | | 30–40 | 10 |
| 18 | 73% CN | 27% CAC | | | 32–39 | 5 |
| 19 | 60% CN | 20% COC | 20% CCn | | 32–38 | 0 |
| 20 | 60% CN | 20% COC | 10% CCn | 10% CNPC | 40–50 | 0 |
| 21 | 65% CN | 25% COC | 10% CNPC | | 34–36 | −2 |
| 22 | 66% CN | 25% CCn | 9% COC | | 40–50 | −5 |
| 23 | 60% CN | 20% COC | 20% DCC | | 42–46 | −7 |
| 24 | 83% CN | 10% DCA | 7% COC | | 20–40 | −10 | polybasic acids include phthalic, sebacic, and azaleic. Preferred polyhydric alcohols include glycerine, ethylene glycol, and diethylene glycol.

Further preferred alkyd-type polymeric plasticizing resins include the following commercially available products:

Koppers resin No. 315 (Koppers Company, Inc.), a non-drying alkyd resin reaction product of phthalic anhydride and diethylene glycol modified with castor oil and tall oil, having a minimum of 9% phthalic anhydride, a maximum acid number of 19, a minimum of 57% oil acids, and a Gardner-Holdt viscosity at 25° C. of W-Y (100% solids);

Koppers resin No. 1533-4, a non-drying alkyd resin reaction product of phthalic anhydride and glycerine modified with castor oil, having a minimum of 36% phthalic anhydride, a maximum acid number of 10, a minimum of 45% oil acids, and a Gardner-Holdt viscosity at 25° C. of V-X in toluene solution containing 60% solids by weight;

Paraplex non-drying alkyd-type polymeric resins (Rohm and Haas Company), particularly, oil-modified polyester resins based on long-chain polybasic acids esterified with a polyhydric alcohol such as glycerol and ethylene glycol, including:

Paraplex RG-2, an oil-modified sebacic acid plasticizing alkyd resin, and Paraplex RGA-2, an oil-modified azaleic acid plasticizing alkyd resin, each being soluble in toluene and having an acid number of 22-35, and a Gardner-Holdt viscosity at 25° C. of I-K at 50% solids in toluene solution;

Paraplex RG-7, an oil-modified sebacic acid plasticizing alkyd resin, and Paraplex RGA-7, an oil-modified azaleic acid plasticizing alkyd resin, each being soluble in toluene and having an acid number of 35-48, and a Gardner-Holdt viscosity at 25° C. of I-K at 50% solids in toluene solution.

Paraplex RG-8, an oil-modified sebacic acid plasticizing alkyd resin, and Paraplex RGA-8, an oil-modified azaleic acid plasticizing alkyd resin, each having an acid number of 0-3.5, and a Gardner-Holdt viscosity at 25° C. of $Z_2$-$Z_3$ (100% solids);

Paraplex RG-10, an oil-modified dibasic acid plasticizing alkyd resin, having an acid number of 0-8 and a Gardner-Holdt viscosity at 25° C. of H-L at 50% solids in toluene.

The color intensifier preferably is present in the new composition in a proportion of about 10-80%, more preferably, 25-60% of the sum of the weights of the intensifier and the polyvinyl butyral polymer. As is apparent from FIGS. 1-5 of the drawings, described hereinafter, the optimum proportions vary from one material to another. They also vary with the polymer grade.

The complete composition preferably contains, in approximate percentages by weight of the composition, 15-50% of the polyvinyl butyral polymer, 5-35% of the color intensifier, and 20-75% of the liquid crystals. As a matter of economy, it is preferred, in general, to employ the lowest proportion of liquid crystals that provides the desired results. Within limits, reductions in the quantity of liquid crystals may be achieved by increasing the proportion of color intensifier.

Films formed from the composition of the invention may be made elastomeric by incorporating in the composition an effective amount of a polyoxyethylene aryl ether. A preferred material is Pycal 94 (ICI United States Inc.), a polyoxyethylene aryl ether classified as a surface active plasticizer, being a pale yellow liquid at 25° C., having a viscosity at 25° C. of approximately 50 centipoises, having an acid number of 2.0 maximum, an hydroxyl number of 203-218, and a pH of 4.0-6.0 in 50% solution in water. The material is soluble in water, ethers, alcohols, ketones, lower aliphatic esters and aromatic hydrocarbon solvents, and insoluble in aliphatic hydrocarbons and vegetable oils. A polyoxyethylene aryl ether is employed in a preferred proportion of about 10-60% of the sum of the weights of the polyvinyl butyral polymer, the color intensifier, and the ether. It is employed in the complete composition in a proportion preferably in the range of about 5-35% by weight of the composition.

The components of the new composition are dissolved in a volatile organic solvent to provide a coating solution, from which a film of the new composition is formed upon evaporation of the solvent. The preferred solvents are mixtures of ethanol or isopropanol and toluene, containing 30-70% of toluene, by weight of the mixture. Other solvents which might be employed, if desired, include isopropanol, ethanol, butanol, dioxane, chloroform (for low solids concentrations) and mixtures thereof. The solids content of the coating solution preferably is in the range of about 10-35% by weight of the solution.

A discrete film of the new composition may be formed by casting or coating the coating solution on a substrate, such as glass, paper, plastic sheets and films, including polyester, polyalkylene, polyurethane, and polyacrylate sheets and films, and oil-free surfaces of various articles and structures, including surfaces being monitored by the film. In the manufacture of a film for subsequent application elsewhere, either alone or in a laminate or the like with one or more other sheets, films or layers affixed thereto, the coating solution may be cast or coated by knife, roller, brush or spray coating, to provide a wet layer on a suitable substrate.

Preferably, the wet layer is on the order of about 2-40 mils thick, to provide a single-layer dry film about 0.1-5 mils thick. Alternatively, the thicker dry films may be produced by repeated coating with thin wet layers and intervening drying. Both supported and unsupported films may be manufactured in the foregoing range of dry film thickness. In general, it is preferred to manufacture the dry films in a thickness of about 0.4-1 mil. The liquid crystal component preferably is employed in a proportion of about 40-70% by weight of the new composition for use in forming films about 0.1-2 mils thick, while a lesser proportion, down to about 20%, may be provided for use in forming films about 2-5 mils thick, whether formed in a single layer or in plural layers.

In order to improve color contrast, the liquid crystals commonly are viewed against an absorptive, particularly a black background, which serves to absorb the transmitted light. For this purpose, the film may be cast on a black-colored polymeric film. Alternatively, the cast film or the sheet or film upon which it is cast may be coated with a layer, particularly a plastic film, containing an absorptive material. Additional alternatives include the incorporation in the coating composition of at least two oil-soluble dyes, as disclosed in our U.S. Pat. No. 4,015,591, or the dispersion in the coating solution of a black particulate material, such as a carbon black powder in a proportion in the range of about 0.1% to 5% of the sum of the weights of the liquid crystals and the powder.

When it is anticipated that the film may be used under circumstances requiring protection from ultraviolet radiation, a compound which absorbs such radiation may be incorporated in the film or in a substrate and/or a protective layer on the film. A suitable ultraviolet radiation absorber is p-phenylazophenol, which may be incorporated in the coating solution in a proportion of about 1–3% by weight of the solids, and other suitable absorbers are known.

The wet layer of coating solution is dried so as to remove essentially all of the solvent. The time and temperature conditions may be varied from drying for about six to twelve hours in the atmosphere at room temperature (20°–25° C.), to drying for about 20–30 minutes at about 50°–60° C. with circulating air, for example. In one method of drying, it is preferred to employ a radiant heater positioned below a transparent substrate while circulating warm air, to avoid forming a skin on the exposed surface of the wet film undergoing drying.

The liquid crystals are finely dispersed throughout a polyvinyl butyral matrix in the dry film. The liquid crystal particles are smaller than can be resolved under a light microscope, i.e., their diameter is less than about one micron.

Liquid crystals dispersed in plastic films are exposed and tend to bleed out of the film at its surfaces, creating sites where crystallization can be seeded. A substrate protects one surface of the film from crystallization. It is preferred to protect the exposed opposite surface of the polyvinyl butyral-liquid crystal film from crystallization with a protective or barrier coat, layer or film of plastic. The protective coat may be cast from solution onto the film, or may be heat-laminated thereon. When the casting procedure is employed, it is preferred to apply a polymer which is soluble in a solvent in which the liquid crystal is not soluble, to prevent the solvent from extracting the liquid crystal into the protective coat. Preferred plastic coating materials include polyvinyl butyral, which may be deposited from solution in a polar organic solvent such as methanol, and polyvinyl alcohol, which may be deposited from aqueous solution, in neither of which polar solvents are liquid crystals soluble. If desired, an absorptive material for transmitted light and/or an ultraviolet radiation absorber may be incorporated in the protective coat. Alternatively, a protective coat may be cast on a release sheet, such as a silicone-coated paper. The sheet with the dry coat thereon then may be inverted over the liquid crystal-containing film, and heat and pressure may be applied to the back of the release sheet, by hot rollers or other suitable means, to cause the protective coat to become fused to the exposed surface of the liquid crystal-containing film.

The protective coat, the polyvinyl butyral-liquid crystal film, and the substrate where a permanent part of the assembly all should have the flexibility and elasticity desired for the intended use. Alternatively, the film and its protective coat, if any, may be peeled off of a substrate for use, in which case, only the coat and the film need have comparable flexibility and elasticity. For example, flexibility may be imparted to a protective coat of polyvinyl butyral by including in the coat as a plasticizer one of the color intensifiers, which also serves as a plasticizer in the film. Where elasticity is desired, a polyoxyethylene aryl ether, as described above, may be incorporated both in the polyvinyl butyral-liquid crystal film and in a polyvinyl butyral protective coat.

An adhesive layer, preferably a layer of pressure-sensitive adhesive, may be applied to the substrate or to the protective coat of a film assembly including the same, for use in affixing the polyvinyl butyral-liquid crystal film to a surface on which it is to be used. The adhesive layer may be provided on the assembly and covered by a release sheet in a conventional manner. Thus, for example, the adhesive layer may be coated on the assembly in a wet layer of about 1–3 mils thickness and dried to a layer of about 0.1–0.2 mil thickness. Alternatively, a similar layer on a release sheet such as silicone-coated release paper may be applied by lamination, with heat and pressure applied to the back of the release paper. The release paper then is allowed to remain on the adhesive layer until time for application of the adhesive layer to the surface on which the assembly is to be mounted.

The polyvinyl butyral-liquid crystal films have a wide variety of uses, and, depending upon the use, they may be supported or unsupported, and protectively coated or uncoated. In this connection, the films may be employed for two or three days without need for protection against bleeding and crystallization, or against ultraviolet radiation. The films may be applied to surfaces with adhesives applied as described above, in the form of sheets or cut into tapes or labels. Tapes and labels can be applied temporarily or permanently to many surfaces or suspended in various mediums for temperature measurement or recording.

Figure 6:
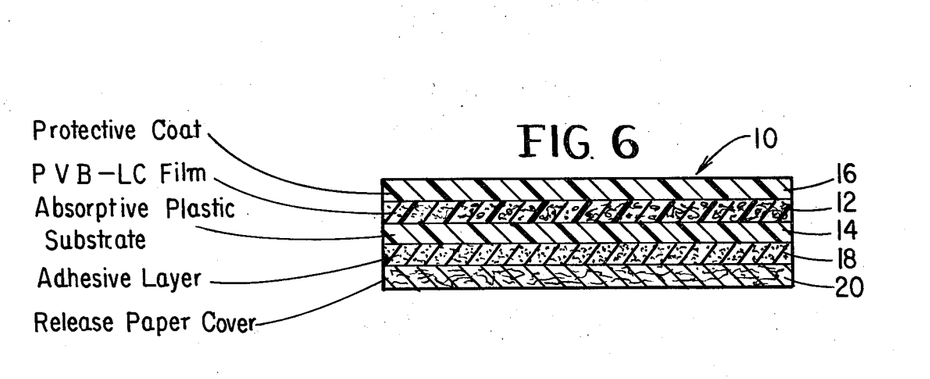
FIG. 6 is a schematic cross sectional view of a film assembly in accordance with the invention.

FIG. 6 is an illustration of a preferred film assembly, described in detail hereinafter, which may be employed in the form of a tape or label, for continuously monitoring the temperatures of ovens, refrigerators, incubators, water and oil baths, laboratory glassware and racks, ice chests, picnic coolers, environmental chambers, sterilizers, baby bottles, food warming trays and covers, food containers, frozen food packages, cooked food packages, electrical equipment including plugs, sockets, fuses and wire insulation, electronic components, and others. The assembly of FIG. 6 also may be employed in stress detection, employing in the polyvinyl butyral-liquid crystal film a temperature-insensitive or temperature-stabilized liquid crystal composition, as known in the art for such purpose. Thus, for example, such compositions are provided by incorporation of about 10–30% by weight of a cholesteryl halide in the liquid crystal composition.

Figure 7:
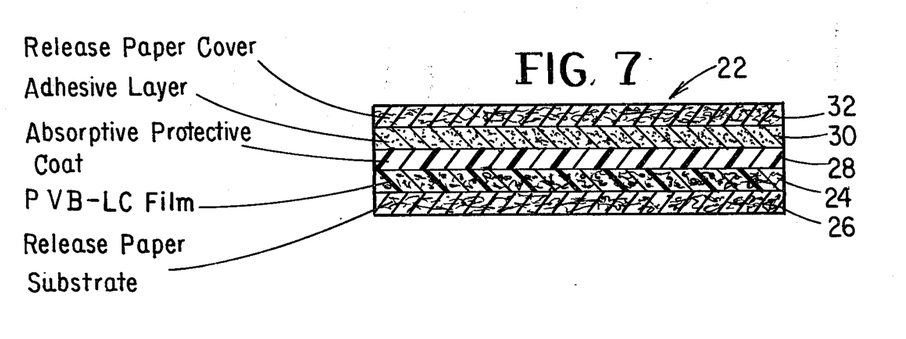
FIG. 7 is a schematic cross sectional view of another film assembly in accordance with the invention.

FIG. 7 illustrates a novel film assembly, described in detail hereinafter, which is especially useful in medical applications. The liquid crystal composition in the polyvinyl butyral-liquid crystal film preferably has a mesophase temperature range in the range of about 20°–40° C., corresponding to the range of skin temperatures which may be encountered over the surface of the human body. An important use of the assembly of FIG. 7 is for vein location prior to venipuncture, in the manner disclosed in our copending U.S. Patent Application Ser. No. 716,376, filed Aug. 23, 1976. Another important use is for thermal mapping of regions of the body, for example, in breast thermography and placental studies.

The following examples illustrate the increased reflectance and reduced waveband width which are obtained in accordance with the invention, thereby providing accentuated intensity and contrast of reflected light, and the manufacture of representative preferred discrete films and film assemblies. It is to be understood that the invention is not limited to the materials, proportions, conditions and procedures employed in the examples, which are merely illustrative.

EXAMPLE 1

Films were made from compositions of Butvar B-72 polyvinyl butyral, liquid crystal composition No. 7 of Table 2, having a mesophase temperature range of 32°-35° C., and one of four different color intensifiers, in the following manner: A series of five casting solutions was made for each combination of polyvinyl butyral, color intensifier, and liquid crystals, at varying weight ratios of polyvinyl butyral to intensifier, as follows: 8:1, 4:1, 2:1, 1:1, and 1:2. A control solution contained polyvinyl butyral and liquid crystals but no intensifier. Five replicates were made of each solution.

Each solution was prepared by first dissolving the polyvinyl butyral and the color intensifier in a combined proportion of 11.5% by weight of the complete solution, in a solvent mixture of equal parts by weight of isopropanol and toluene, at room temperature (20°-25° C.) and with high shear agitation. The liquid crystals then were added in a proportion of 11.5% by weight of the complete solution, so that the liquid crystals constituted 50% by weight of the total solids in each solution. In addition, solutions were made up in like manner with one of the intensifiers, as described below, but with the addition of the liquid crystals in a proportion of 23% by weight of the complete solution, so that the liquid crystals constituted 66⅔% of the total solids.

The casting solutions were cast by knife-coating onto a black-colored absorptive sheet of polyethylene glycol terephthalate (Mylar) 2 mils thick, serving as a substrate. In each replicate of each comparative test, the six solutions having varying proportions or no intensifier were cast simultaneously. The wet thickness of the cast layers was about 8 mils. The castings were air-dried at room temperature for 24 hours, producing film assemblies of dry polyvinyl butyral films about 0.4 mil thick on the substrate.

The light reflectance and relative spectral band width of each dry film was determined using a temperature-controlled reflectance spectrophotometer. A monochromatic non-polarized light source and a photocell connected to a recorder were mounted at an angle of about 90° to the film assembly. With the film temperature-controlled for peak reflectance at 530 nanometers (nm), corresponding to the color green, the film was illuminated with light of 530 nm wave length. Light was directed at the exposed face of the film, for penetration of the polyvinyl butyral matrix and reflection by the liquid crystals dispersed therein. Reflected or scattered light intensity was determined as percent of the illuminating light that was reflected.

The relative spectral band width was determined by varying the wave length of the illuminating light through the visible spectrum while controlling the film temperature for peak reflectance at 530 nm, measuring the percent of the illuminating light that was reflected at each wave length, and plotting the percent reflectance (Y-axis) versus the wave length (X-axis). The curve obtained reaches a peak at 530 nm, and the "relative waveband width" was measured as the width of such curve (distance between abscissas of the points of intersection of a line parallel to the X-axis) at a height (ordinate) which as ⅔ the height of the curve.

The color intensifiers employed and the results obtained, based on averages of the replicates, were as follows, with reference to FIGS. 1-5 of the drawings, wherein percent light reflected and relative waveband width, respectively, are plotted against the concentration of the color intensifier, in percent of the sum of the weights of the polyvinyl butyral and the intensifier:

A. The color intensifier was Paraplex RG-8 alkyd resin. The liquid crystal proportion was 50% by weight of the total solids in the coating solution and in the dry film. The results of the comparative tests are shown graphically in FIG. 1. It will be noted that light reflectance approaching the theoretical was achieved with a concentration of about 38% of the color intensifier. The relative waveband width of reflected light was a minimum, so that color purity and therefore contrast were at a maximum, at about the same concentration of the color intensifier.

B. The color intensifier was Koppers resin No. 315, and the liquid crystal was present in a proportion of 50% by weight of the total solids. The test results are shown graphically in FIG. 2. The maximum reflectance, approaching theoretical, and the minimum waveband width were obtained at a proportion of about 42% of the color intensifier.

C. The color intensifier was a mixture of equal weights of Paraplex RGA-8 alkyd resin and 40 weight process castor oil, and the liquid crystal was present in a proportion of 50% by weight of the total solids. The test results are shown graphically in FIG. 3. The maximum reflectance and minimum waveband width were obtained at a proportion of about 40% of the color intensifier.

D. The color intensifier was 40 weight process castor oil, and the liquid crystal was present in a proportion of 50% by weight of the total solids. The test results are shown graphically in FIG. 4. The maximum reflectance and minimum waveband width were obtained at a proportion of about 43% of the color intensifier.

E. The color intensifier was 40 weight process castor oil, and the liquid crystal proportion was 67% by weight of the total solids. The test results are shown graphically in FIG. 5. The maximum reflectance, approaching theoretical, and the minimum waveband width were obtained at a proportion of about 43% of the color intensifier.

Figure 1:
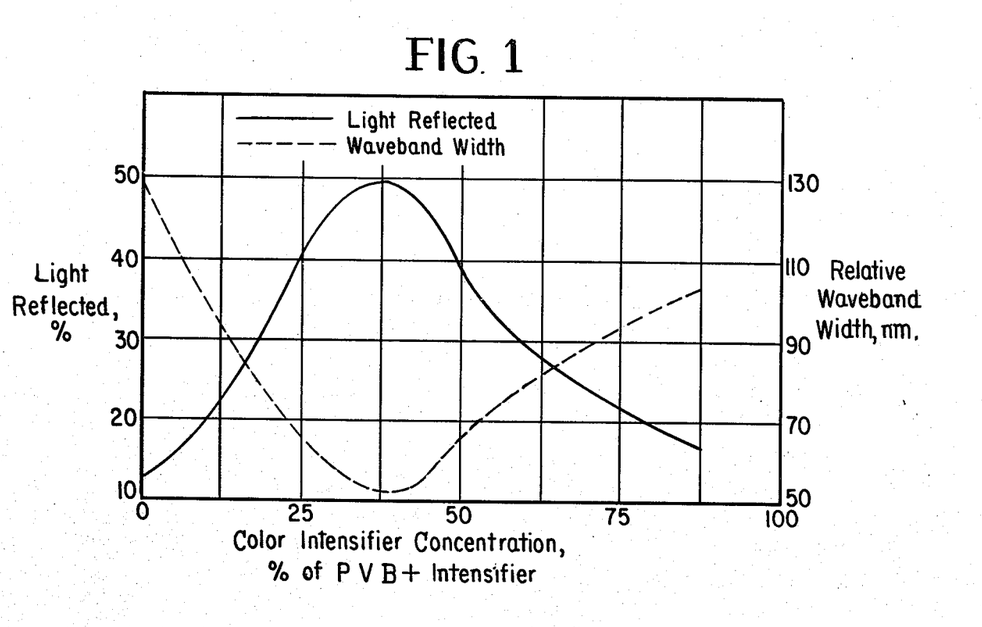
FIGS. 1–5 are optical analyses of polyvinyl butyral-liquid crystal dispersion films employing varying concentrations of color intensifiers therein, each view illustrating the results obtained with a different intensifier representative of the intensifiers which may be employed in the invention.
Figure 2:
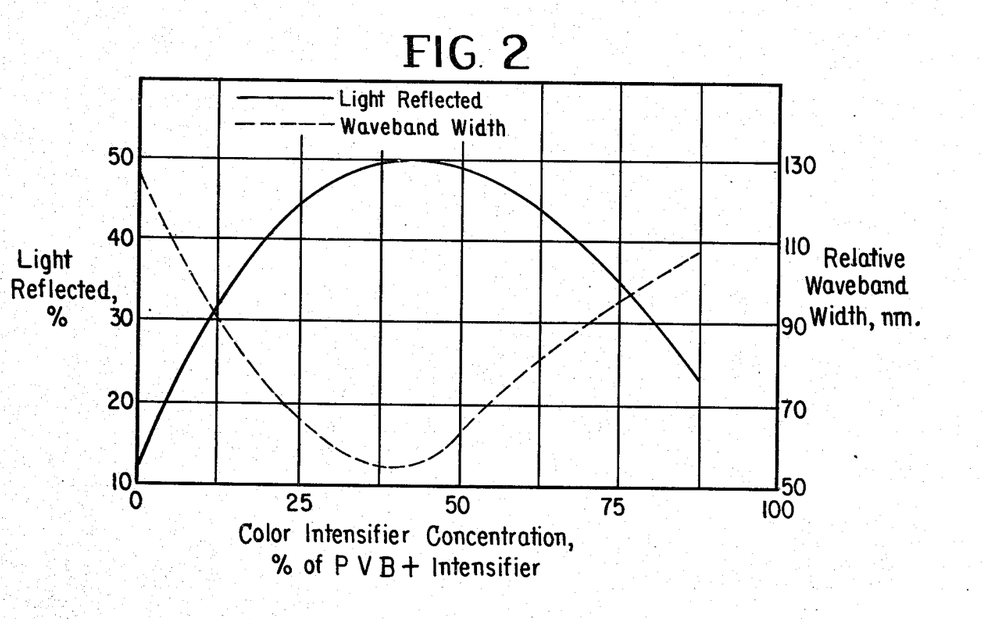
Figure 3:
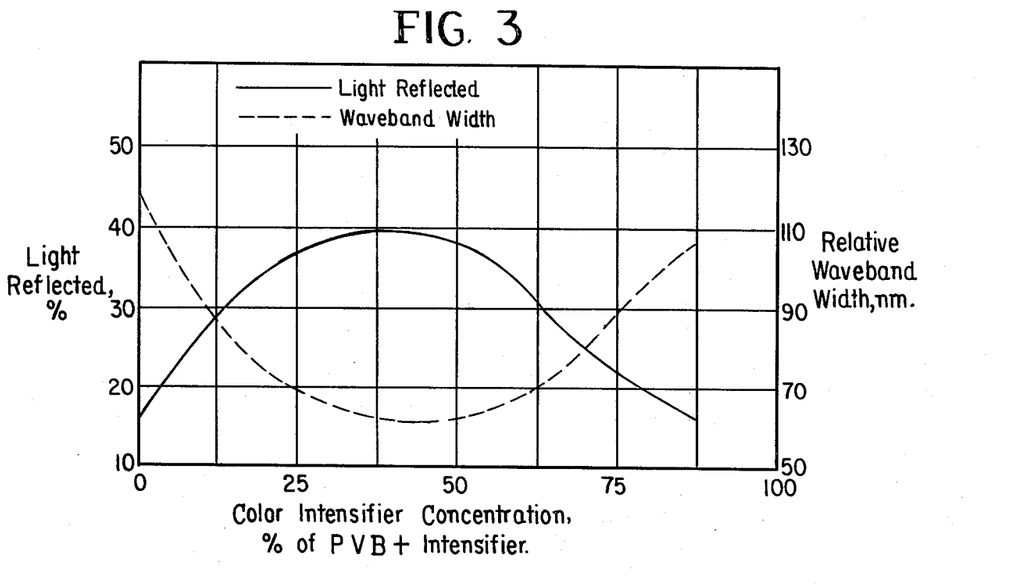
Figure 4:
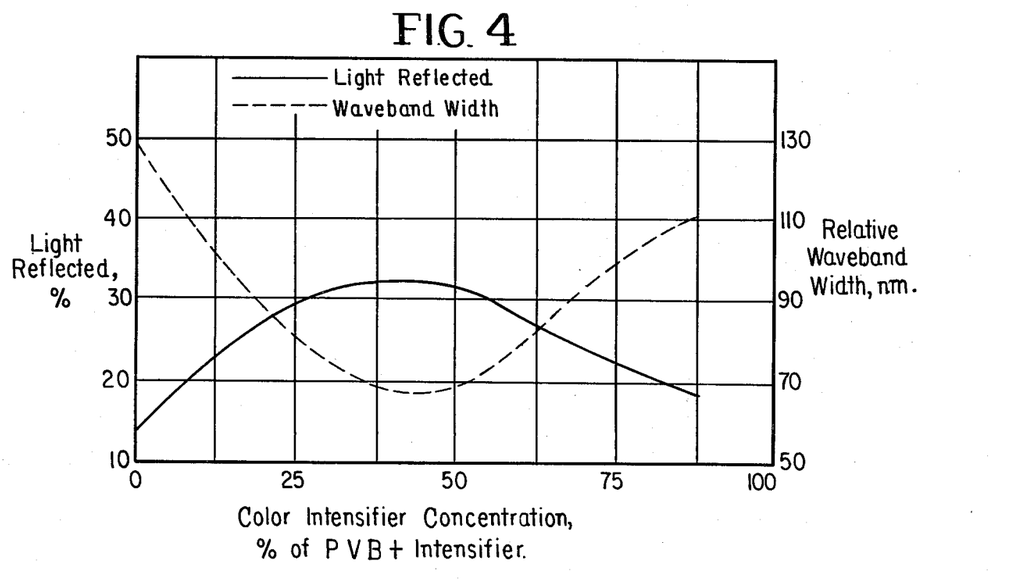
Figure 5:
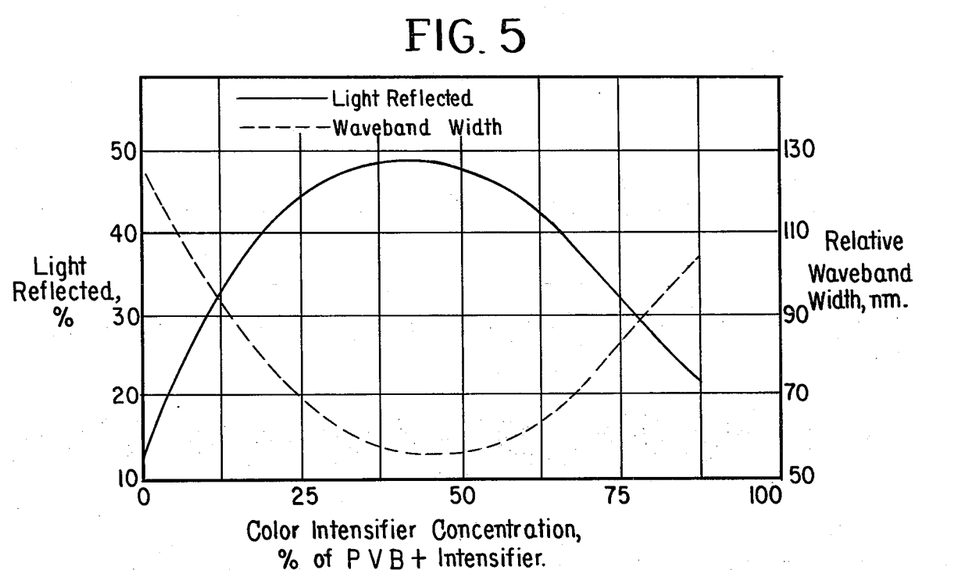

A comparison of FIG. 5 with FIGS. 1-4 indicates that, with other things being equal, a higher proportion of liquid crystals is required with castor oil as the color intensifier, in order to achieve the same order of reflectance and color purity as obtained when using one of the plasticizing resins Paraplex RG-8, Koppers Resin No. 315, and Paraplex RGA-8.

The results show that, in general, when the castor oil or alkyd-type polymeric plasticizing resin color intensifier is employed in a proportion of about 10-80% of the sum of the weights of the intensifier and the polyvinyl butyral polymer, at least noticeable or detectable improvements in light reflectance and color contrast are obtained, and at a proportion of about 25-60%, marked improvements are obtained.

EXAMPLE 2

The compositions of Table 5, which include composition No. 7 of Table 2 as the liquid crystal composition, have light reflectances of 40% or greater when formed as films and evaluated in the manner of Example 1.

TABLE 5

| (1) Butvar PVB | | (2) Color Intensifier | | | (3) Liquid Crystals, |
|---|---|---|---|---|---|
| *% | Grade | *% | % of (1) + (2) | Type | *% |
| 30 | B-72 | 20 | 40 | Paraplex RG-8 | 50 |
| 30 | B-72 | 20 | 40 | Paraplex RGA-2 | 50 |
| 30 | B-72 | 20 | 40 | Koppers No. 315 | 50 |
| 30 | B-72 | 20 | 40 | Koppers No. 1533-4 | 50 |
| 20 | B-72 | 13 | 39.4 | Castor Oil, 40 wt. | 67 |
| 20 | B-73 | 30 | 60 | Paraplex RGA-8 | 50 |
| 20 | B-73 | 13 | 39.4 | Paraplex RGA-8 | 67 |
| 16 | B-79 | 17 | 51.4 | Koppers No. 315 | 67 |
| 20 | B-79 | 30 | 60 | Koppers No. 315 | 50 |
| 25 | B-90 | 25 | 50 | Koppers No. 1533-4 | 50 |
| 24 | B-90 | 16 | 40 | Koppers No. 1533-4 | 60 |

*Percent by weight of composition (1) + (2) + (3)

EXAMPLE 3

Laminated articles in the form of sheets, tapes and labels which may be affixed to various articles and surfaces may be formed from the film assembly 10 of FIG. 6. The assembly 10 includes a polyvinyl butyral-liquid crystal film 12 cast on an absorptive plastic substrate 14, a transparent protective coat 16 cast on the outer surface of the film 12, an adhesive layer 18 adhered to the outer surface of the substrate 14, and a silicone-coated release paper 20 adhered to the outer surface of the adhesive layer 18.

The film assembly 10 is prepared for use in monitoring incubator temperatures in the following manner: a 4-gram quantity of Paraplex RG-8 alkyd resin is dissolved in a 100-gram quantity of equal parts by weight of toluene and 95% isopropanol-water. An 8-gram quantity of Butvar B-73 polyvinyl butyral is added slowly to the solution during high speed shear agitation. The polyvinyl butyral is dissolved during agitation for one hour. A 12-gram quantity of liquid crystal composition No. 10 of Table 2, having a mesophase temperature range of 36°–39° C., is dissolved in 12 grams of toluene. The liquid crystal solution is added to the polyvinyl butyral solution with high speed shear agitation, and dissolved therein. Air bubbles are removed from the resulting solution under vacuum.

The solution is knife-coated onto a 2 mil thick black-colored absorptive sheet 14 of polyethylene glycol terephthalate (Mylar), in a wet coating thickness of about 8 mils. An area of approximately 40 sq. ft. is coated. The film is allowed to dry in the atmosphere at room temperature, about 20°–25° C., for 12 hours, and the thickness of the resulting dry film 12 is about 0.4 mil.

A coating composition is prepared by dissolving 2.5 grams of Paraplex RG-8 alkyd resin and 10 grams of Butvar B-73 polyvinyl butyral in 100 grams of methanol. The coating composition is knife-coated on the outer surface of the polyvinyl butyral-liquid crystal film 12 in a layer having a wet thickness of 4 mils. The wet coat is dried for 12 hours in the atmosphere at 20°–25° C., to provide a transparent protective coat 16 about 0.2 mil thick on the film 12.

A pressure-sensitive adhesive coating composition of water-dispersible polyvinyl acetate in aqueous dispersion (Borden Chemical) is coated on a release paper sheet material having a dry cured silicone film thereon. The composition is provided on the release paper in a wet thickness of about 1–2 mils. The coated sheet material is dried for 2 hours in the atmosphere at 20°–25° C., to provide a dry adhesive layer about 0.1–0.2 mil thick on the paper.

The outer surface of the adhesive layer is applied to the outer surface of the substrate 14 illustrated in FIG. 6, and a hot iron at a temperature sufficient to soften the adhesive layer is pressed against the outer surface of the release paper, to laminate the adhesive layer 18 to the substrate 14, with the release paper forming a cover 20 adhered to the adhesive layer.

The resulting film assembly 10 may be cut into tapes and labels and affixed to test tubes, flasks, or other articles in an incubator. For this purpose, the release paper cover 20 is peeled off of the adhesive layer 18, the adhesive layer 18 is placed against the outer surface of an article, and the remainder of the assembly 10 is pressed against the article. The tapes and labels monitor temperatures in the incubator, with the colors exhibited by the tapes and labels as viewed through the protective coat 16 serving to indicate the temperatures of the articles.

EXAMPLE 4

Frozen food thaw indicator labels are made from sheet material which consists of the film assembly 10 illustrated in FIG. 6. The film assembly 10 is made in the manner described in Example 3, except that the liquid crystal composition is No. 20 of Table 3, having a mesophase temperature range of 40°–50° C. and a glass-transition temperature Tg of 0° C. If desired, the Paraplex RG-8 alkyd resin employed in Example 3 may be replaced by an equal amount (4 grams) of 30 weight process castor oil.

The sheet material is cut into one inch square labels for application to frozen food packages. The labels are heated from room temperature (about 20°–25° C.) to 50° C., at which temperature the liquid crystals have a violet color, which is viewed through the protective coat 16. The labels are fast-cooled by placing them on a surface which is at −40° C., and they cool to the temperature of the surface within a fraction of a second. The supercooled liquid crystals in the label retain their violet color. The release paper cover 20 is removed, and the label is affixed to a frozen food package that is below 0° C., by pressing the adhesive layer 18 against the surface of the package.

The color exhibited by the label remains violet unless the temperature at the surface of the package, adjacent to the label, reaches 0° C. In that event, the color of the liquid crystals changes slowly from the violet color, successively to blue, green, red, and black, over a period of approximately one hour at 0° C. At higher temperatures, the color change takes place more rapidly, e.g., within several minutes at 5° C.

The color change is irreversible: after the color has changed, cooling the food package to a lower temperature will not restore the violet color. In this manner, the label serves as a temperature limit monitor, recording the occurrence of warming to the glass-transition temperature of 0° C.

EXAMPLE 5

The polyvinyl butyral-liquid crystal compositions of Table 6 may be employed to form films in the manner of Example 3, which films are useful for temperature limit detection. The films may be incorporated in a film assembly 10, as illustrated in FIG. 6, or adapted for use in other ways. The films or film assemblies embodying the films may be affixed to the surfaces of frozen food packages or other articles, where they serve as monitors of predetermined limit temperatures which correspond to their respective glass-transition temperatures Tg.

TABLE 6

| (1) Butvar PVB | | (2) Color Intensifier | | (3) Liquid Crystals | |
|---|---|---|---|---|---|
| *% | Grade | *% | % of (1) + (2) | Type | *% | Comp. No. |
| 20 | B-72 | 20 | 50 | Koppers No. 315 | 60 | 17 |
| 18 | B-72 | 15 | 45.4 | Paraplex RG-8 | 67 | 21 |
| 18 | B-73 | 15 | 45.4 | Castor Oil, 40 wt. | 67 | 19 |
| 20 | B-73 | 25 | 55.5 | Koppers No. 1533-4 | 55 | 23 |
| 20 | B-79 | 20 | 50 | Paraplex RGA-2 | 60 | 21 |
| 17 | B-90 | 16 | 48.5 | Koppers No. 315 | 67 | 17 |

*Percentages by weight of composition (1) + (2) + (3)

EXAMPLE 6

The film assembly 22 illustrated in FIG. 7 includes a polyvinyl butyral-liquid crystal film 24 cast on a release paper substrate 26 and having an absorptive protective coat 28 cast thereon. An adhesive layer 30 is adhered to the outer surface of the protective coat 28, and a release paper cover 32 is adhered to the outer surface of the adhesive layer. The assembly 22 is used in the form of sheets, strips and the like. In use in medical applications, the cover 32 is removed from the adhesive layer 30, and the adhesive layer is pressed against the skin, to affix the remainder of the assembly to the skin. The release paper substrate 26 then is removed from the polyvinyl butyral-liquid crystal film 24, which is exposed for viewing. Inasmuch as the common medical applications involve relatively temporary use of the film assembly on the body, the exposed surface of the film 24 need not have a protective coat thereover.

A typical film assembly 22 is made in the following manner: 4 grams of 40 weight process castor oil, 4 grams of Paraplex RGA-2 alkyd resin, and 4 grams of Pycal 94 polyoxyethylene aryl ether are dissolved in 100 grams of equal parts by weight of toluene and 95% isopropanol-water. A 15 gram quantity of Butvar B-72 polyvinyl butyral is added to the solution slowly with high shear agitation. When the polyvinyl butyral is dissolved, a 27 gram quantity of liquid composition No. 4 of Table 2 dissolved in 27 grams of toluene is added.

The solution is knife-coated onto the release paper substrate 26, which is paper coated with a cured silicone film. The wet thickness of the coating is 10 mils. The substrate is conveyed through an infrared oven having circulating air at a temperature of 50°-60° C., in which the wet layer is dried to a film 24 about 0.5 mil thick on a surface of the release paper substrate 26.

4 grams of 40 weight process castor oil, 4 grams of Pycal 94 polyoxyethylene aryl ether, and 15 grams of Butvar B-72 polyvinyl butyral are dissolved in 100 grams of methanol. 2 grams of a carbon black dispersion in alcohol (Alcoblak B, product of Columbian Carbon Black Co.) is dispersed in the solution for one hour using high shear agitation. The mixture is coated on the polyvinyl butyral-liquid crystal film 24 in a layer of 4 mils wet thickness and dried in an infrared oven, in the same manner as in the preparation of the film 24. An absorbent protective coat 28 having a dry thickness of about 0.2-0.3 mil is provided on the surface of the film 24 in this manner.

A pressure-sensitive adhesive layer is provided on a siliconized release paper, and the adhesive layer is laminated to the outer surface of the protective coat 28, as described in Example 3, to provide the adhesive layer 30 and the release paper cover 32 thereon and complete the film assembly 22.

The release paper substrate 26 and the release paper cover 32 are removed from the remainder of the film assembly 22, whereupon the latter may be stretched to conform to the skin surface contours upon application to the body, with the adhesive layer 30 pressed against the skin to cause the remainder of the assembly to adhere thereto. The elasticity of the film 24 and the protective coat 28 render the assembly 22 especially useful for medical thermography. The assembly 22 also is very useful for vein location in connection with venipuncture, in the manner disclosed in our aforesaid copending patent application.

When the feature of elasticity is not needed, the polyoxyethylene aryl ether may be omitted from the compositions from which the film 24 and the protective coat 28 are formed. In either case, the specific polyvinyl butyral polymer, color intensifiers, and liquid crystal composition employed in the example may be replaced by other members of the respective classes of materials disclosed hereinabove. For example, 8 grams of Paraplex RG-8 alkyd resin or 8 grams of Koppers resin No. 315 may be substituted for the castor oil and the Paraplex RGA-2 in the composition forming the film 24, to provide excellent polyvinyl butyral-liquid crystal films and film assemblies. Whether or not the polyoxyethylene aryl ether is employed, the films are very supple and are readily applied to skin surfaces for excellent heat transfer and color displays accurately corresponding to the skin temperatures.

EXAMPLE 7

A temperature-sensitive polyvinyl butyral-liquid crystal paint that may be brush-coated on surfaces for industrial thermographic applications is prepared as follows: 10 grams of Koppers resin No. 315 alkyd resin and 20 grams of Butvar B-98 polyvinyl butyral are dissolved with high shear agitation in 200 grams of equal parts by weight of toluene and ethanol. A 30-gram quantity of liquid crystal composition No. 12 of Table 2 admixed with 0.5% of the weight thereof of an oil-soluble dye composition containing, in proportions by weight, 50% of D & C Violet 2, 25% D & C Red 17, and 25% D & C Yellow 11, is dissolved in 30 grams of toluene. The liquid crystal solution is added to the polyvinyl butyral solution, to provide a solution which can be brushed onto oil-free surfaces for use as a temperature-sensitive paint when dry. The solution may be brushed onto a surface in a wet thickness of about 10-20 mils, to provide a dry film or coating thereon of about 0.5-1 mil thickness. The liquid crystals exhibit a color temperature range of 40°-60°, i.e., the range is lowered about 3° C. by incorporation in the film. The film, not having a protective coating thereon, is useful for indicating temperatures by color responses for a period of about 2-3 days.

The mesophase temperature ranges and the glass-transition temperatures set forth in Tables 2 and 3 were determined employing materials of high purity. Such temperatures will vary with the degree of purity. Moreover, low relative purities may cause the temperature range at which colors are exhibited to change when the liquid crystals are dispersed in polyvinyl butyral. Also, it is noted that with liquid crystal compositions having relatively high mesophase temperatures and/or relatively wide mesophase temperature ranges, there is a tendency for the mesophase temperature range to change when incorporated in the polyvinyl butyral. For example, the mesophase temperature range exhibited by the liquid crystals in the film of Example 7 is about 3° lower than the mesophase temperature range of the liquid crystal composition prior to its incorporation in the film. On the other hand, the mesophase temperature ranges of the liquid crystal compositions employed in Examples 3, 4, and 6 vary less than about 0.25° C. when dispersed in polyvinyl butyral. For greatest accuracy, the mesophase temperature range exhibited by the liquid crystals should be determined when the liquid crystals are incorporated in the film.

The invention thus provides a polyvinyl butyral-liquid crystal composition and a film formed thereof, the liquid crystals being dispersed throughout a protective polyvinyl butyral matrix in the film while yet providing high color intensity and contrast, enabling the advantageous properties of the liquid crystals to be utilized to their fullest in numerous applications. The composition is readily and economically compounded and provided in the form of a film, and the film is convenient and easy to handle and apply, alone or in assemblies or laminates with accessory films, layers, coats, sheets and the like.

While certain preferred embodiments of the invention have been described and illustrated, it will be apparent to those skilled in the art that various changes and modifications may be made therein within the spirit and scope of the invention. It is intended that such changes and modifications be included within the scope of the appended claims.

We claim:

1. In a composition of matter including a mixture of a polyvinyl butyral film-forming polymer and a cholesteric liquid crystalline phase material, said mixture being adapted for forming a film comprising a matrix of said polymer having said material dispersed therein, which film provides a visible response to the application of energy, the improvement which comprises a member selected from the group consisting of oil-modified alkyd-type polymeric plasticizing resins and castor oil intimately mixed with said polymer and said material, thereby to provide a composition which when in the form of said film exhibits accentuated intensity and contrast of visible light waves reflected by said material.

2. A composition as defined in claim 1 and wherein said member is castor oil.

3. A composition as defined in claim 1 and wherein said member is an oil-modified polyester of a polybasic acid and a polyhydric alcohol.

4. A composition as defined in claim 3 and wherein the modifying oil is castor oil.

5. A composition as defined in claim 3 and wherein said acid is selected from the group consisting of phthalic, sebacic, and azaleic acids, and said alcohol is selected from the group consisting of glycerine, ethylene glycol, and diethylene glycol.

6. A composition as defined in claim 5 and wherein the modifying oil is castor oil.

7. A composition as defined in claim 1 and wherein said member is present in a proportion of about 10-80% of the sum of the weights of said member and said polymer.

8. A composition as defined in claim 7 and wherein said material is present in a proportion of about 20-75% by weight of the composition.

9. A composition as defined in claim 7 and containing, in approximate percentages by weight of the composition, 15-50% of said polymer, 5-35% of said member, and 20-75% of said material.

10. A composition as defined in claim 1 and wherein the mesophase temperature range of said material falls within the range of about 20°-40° C.

11. A composition as defined in claim 1 and wherein the material is adapted to be fast-cooled from a first temperature in its mesophase temperature range to a second temperature below its glass-transition temperature while retaining a color characteristic of the material at said first temperature, and when warmed to a temperature substantially equal to said glass-transition temperature exhibits a color change which is irreversible by cooling from the glass-transition temperature to said second temperature, thereby to visually indicate the occurrence of said warming.

12. A composition as defined in claim 11 and wherein said material includes a viscosity-increasing agent selected from the group consisting of the dicholesteryl esters of saturated and unsaturated aliphatic alpha, omega-dicarboxylic acids containing from 2 to 27 carbon atoms, and cholesteryl p-nonylphenyl carbonate.

13. An article of manufacture for indicating that a predetermined limit temperature has been reached and which comprises a discrete film of the composition of claim 11, wherein the glass-transition temperature of said material is substantially equal to said limit temperature.

14. A thaw indicator which comprises an article as defined in claim 13 and wherein said material has a glass-transition temperature up to about 10° C.

15. A coating composition which comprises a solution of the composition of claim 1 in a volatile organic solvent.

16. An article of manufacture which comprises a discrete film of the composition of claim 1.

17. A film assembly which comprises a discrete film of the composition of claim 1 cast upon a release sheet substrate, a light-absorptive protective plastic coat adhered to said film, an adhesive layer adhered to said coat, and a release sheet cover on said layer.

18. A composition of matter which comprises an intimate mixture of:

(a) a polyvinyl butyral film-forming polymer having an average molecular weight in the range of about 30,000–270,000, a butyral content expressed as polyvinyl butyral of about 80–90% by weight, an hydroxyl content expressed as polyvinyl alcohol of about 9–21% by weight, and an acetate content expressed as polyvinyl acetate of about 0–3% by weight;

(b) a member selected from the group consisting of oil-modified alkyd-type polymeric plasticizing resins and castor oil in a proportion of about 10–80% of the sum of the weights of said member and said polymer; and (c) a cholesteric liquid crystalline phase material in a proportion of about 20–75% by weight of the composition;

said mixture being adapted for forming a film comprising a matrix of said polymer having said material dispersed therein, which film provides a visible response to the application of energy, said film exhibiting accentuated intensity and contrast of visible light waves reflected from said material.

19. A composition as defined in claim 18 and wherein said polymer is present in a proportion of about 15–50% by weight of the composition.

20. A composition as defined in claim 18 and wherein said member is castor oil.

21. A composition as defined in claim 18 and wherein said member is an oil-modified polyester of an acid selected from the group consisting of phthalic, sebacic, and azaleic acids, and an alcohol selected from the group consisting of glycerine, ethylene glycol, and diethylene glycol.

22. A composition as defined in claim 21 and wherein the modifying oil is castor oil.

23. A composition as defined in claim 22 and containing, in approximate percentages by weight of the composition, 15–50% of said polymer and 5–35% of said member.

24. A coating composition which comprises a solution of the composition of claim 18 in a volatile organic solvent.

25. An article of manufacture which comprises a discrete film of the composition of claim 18.

* * * * *

UNITED STATES PATENT AND TRADEMARK OFFICE
CERTIFICATE OF CORRECTION

PATENT NO. : 4,161,557
DATED : July 17, 1979
INVENTOR(S) : Fred K. Suzuki and Thomas W. Davison It is certified that error appears in the above-identified patent and that said Letters Patent are hereby corrected as shown below:

Col. 6, line 34, last column of heading in Table 4 change "Viscosity, cps" to --2.Solution Viscosity, cps--.

Col. 6, line 51, before "alkyd-type" insert --oil-modified--.

Col. 6, lines 52 and 53, after "straight" delete --oil-modified--.

Col. 11, line 68, change "as" to --was--.

Col. 18, line 32, change "the" to --said--.

Signed and Sealed this

Thirtieth Day of October 1979

[SEAL]

Attest:

RUTH C. MASON
Attesting Officer

LUTRELLE F. PARKER
Acting Commissioner of Patents and Trademarks